(12) United States Patent
Lim

(10) Patent No.: US 7,689,212 B2
(45) Date of Patent: Mar. 30, 2010

(54) MOBILE COMMUNICATION SYSTEM EXCHANGING STATE INFORMATION AND OPERATION METHOD THEREOF

(75) Inventor: Guk-Chan Lim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 485 days.

(21) Appl. No.: 10/678,156

(22) Filed: Oct. 6, 2003

(65) Prior Publication Data
US 2004/0097224 A1 May 20, 2004

(30) Foreign Application Priority Data
Nov. 18, 2002 (KR) .................... 10-2002-0071552
Nov. 18, 2002 (KR) .................... 10-2002-0071553

(51) Int. Cl.
*H04W 24/00* (2009.01)

(52) U.S. Cl. .............. 455/425; 455/343.1; 455/419; 455/428; 455/445; 455/514; 455/566; 370/328; 370/338

(58) Field of Classification Search .......... 455/425, 455/343.1, 343.2, 343.5, 573, 419, 428, 445, 455/514, 566; 370/328, 338
See application file for complete search history.

(56) References Cited

U.S. PATENT DOCUMENTS

| | | | | |
|---|---|---|---|---|
| 4,775,995 A * | 10/1988 | Chapman et al. | ............ | 455/522 |
| 5,640,684 A * | 6/1997 | Konosu et al. | ............ | 455/67.7 |
| 5,995,849 A * | 11/1999 | Williams et al. | ............ | 455/555 |
| 6,049,723 A * | 4/2000 | Park | ............ | 455/564 |
| 6,084,870 A * | 7/2000 | Wooten et al. | ............ | 370/349 |
| 6,236,326 B1 * | 5/2001 | Murphy | ............ | 340/636.1 |
| 6,275,713 B1 * | 8/2001 | Toda | ............ | 455/564 |
| 6,442,261 B1 * | 8/2002 | Pearsall | ............ | 379/142.01 |
| 6,445,921 B1 * | 9/2002 | Bell | ............ | 455/426.1 |
| 6,650,913 B1 * | 11/2003 | Hayashi | ............ | 455/575.3 |
| 6,731,937 B1 * | 5/2004 | Spinner | ............ | 455/445 |
| 6,757,263 B1 * | 6/2004 | Olds | ............ | 370/315 |
| 2003/0064708 A1 * | 4/2003 | Oota et al. | ............ | 455/412 |
| 2004/0062383 A1 * | 4/2004 | Sylvain | ............ | 379/265.06 |

FOREIGN PATENT DOCUMENTS

| | | |
|---|---|---|
| CN | 1209713 | 3/1999 |
| JP | 06-311107 | 11/1994 |
| KR | 2002-0040375 | 5/2002 |

OTHER PUBLICATIONS

Korean Office Action Dated Mar. 18, 2005.
Office Action dated Aug. 26, 2005 in co-pending Chinese Patent Application No. 200310116370.3 (with English Translation).

* cited by examiner

*Primary Examiner*—Nghi H Ly
(74) *Attorney, Agent, or Firm*—Ked & Associates LLP

(57) ABSTRACT

A system and method for managing calls in a mobile communication system transmits information indicative of an operational state of a first mobile terminal to a second mobile terminal for display. The first terminal may be a called terminal and the second terminal a calling terminal. A user of the second terminal can therefore recognize a reason for a communication blockage if a call between the first and second terminals is lost.

24 Claims, 3 Drawing Sheets

MOBILE COMMUNICATION SYSTEM EXCHANGING STATE INFORMATION AND OPERATION METHOD THEREOF

BACKGROUND OF THE INVENTION

1. Field of the Invention

The present invention generally relates to a mobile communication system and more particularly to a system and method of exchanging state information in a mobile communication system.

2. Background of the Related Art

Recent developments in mobile communication techniques have allowed mobile communication terminals to transmit and receive various types of multimedia such as images, mobile images, various types of data as well as voice. The terminals also provide users with services that allow a battery state or reception state to be checked through a display unit such as an LCD, make a phone call simply by searching a desired phone number through a late call list memory function or a phone number storing function, and check his/her current position with a global positioning system (GPS) function combined with the mobile terminal.

FIG. 1 illustrates a construction of a general mobile communication system, and FIG. 2 is a flow chart of a call processing operation performed in the mobile communication system.

As shown in FIG. 1, the mobile communication system includes mobile communication terminals 10a and 10b and a base station 20. The terminals perform voice call communication and a supplementary service by sending an originating call or receiving a terminating call while moving. The base station 20 processes the originating call transferred from the mobile communication terminals or transfers a terminating call requested from an external system to the mobile communication terminals, and also processes channel information together with the mobile communication terminals through a paging channel.

As shown in FIG. 2, a call processing operation of the mobile communication system is performed as follows. When power is applied to a mobile communication terminal, the terminal is initialized. In the initialization state, the terminal reads information required for its operation from an EEPROM and sets a parameter, and receives required system information through a pilot channel and a sync channel transmitted from the base station, putting it into an idle state. That is, in the initialization state, information required for the mobile communication terminal is set and the environment for transition to the idle state is set.

In idle state, the mobile communication terminal is maintained in a state that it can receive a system parameter through the sync channel or respond to various messages such as paging.

When a user makes a phone call with the mobile communication terminal, the terminal executes a system connection to the base station through an access channel and transfers an originating call.

In a traffic state, the base station processes the originating call received from the terminal and transfers a termination call to the mobile terminal of the other party, thereby making a call connection between the terminals. At this time, the mobile communication terminal displays a propagation strength on a display unit using an internal received signal strength indication (RSSI) function.

When the mobile communication terminal completes a specific operation in the system access state, it returns to the idle state or to the traffic state. If the mobile communication terminal fails to receive a paging channel in the idle state, it switches to the initialization state.

FIG. 3 is a flow chart of a process for performing call communication in the mobile communication system in accordance with the related art. When an originating call is generated from the originating side terminal 10a and transmitted to base station 20 (step S11), the base station receives the originating call, generates a terminating call, and transfers it to the receiving side terminal 10b. As the receiving side terminal 10b responds to the terminating call, the originating and receiving side terminals are connected for call (step S12). At this time, the display units of the originating and receiving side terminals display current state information, propagation strength, or the like.

When a user of the originating side terminal 10a or the receiving side terminal 10b presses 'END' or a call is not available because of a network failure, a communication release message is transferred to the base station 20 (step S13). Then, the base station 20 transfers the communication release message to the receiving side terminal 10b or to the originating side terminal 10a and the call connection state is released (step S14).

As the call connection is released, the originating and receiving side terminals return to the initialization state (step S15). Meanwhile, the user of the terminal which has been released in its call connection due to the network failure may attempt a call again.

The mobile communication system of the related art has at least the following problems.

First, the user of the originating side terminal can recognize the state of the originating side terminal but not the state of the receiving side terminal. Thus, if the receiving side terminal rejects a call of the originating side terminal, or if a network failure occurrence makes a call connection unavailable, the originating side terminal may repeatedly attempts a re-connection to the receiving side terminal. This degrades users' convenience.

More specifically, if a communication failure occurs, for example, because the user of the receiving side terminal has intentionally turned off his terminal, or because the receiving side terminal has been turned off as a result of a low-voltage condition of a battery, or because a propagation reception state of the receiving side terminal is so bad that a call is disconnected, the user of the originating side terminal, who does not know about the state of the receiving side terminal, may attempt a call connection repeatedly to no avail.

Second, after a call connection is released because of a network failure, when the user of the originating side terminal attempts re-connection to the receiving side terminal, the user must re-enter the entire key sequence (e.g., receiving terminal's telephone number) to transfer a recall signal, resulting in degradation of users' convenience.

Third, if the user of the originating side terminal keeps attempting re-connection to the receiving side terminal in a situation that a call connection cannot be made because of a network failure, not only is the battery power of the originating side terminal substantially consumed for generation of the originating call but also the base station must allocate a channel continuously for the attempted re-connecting. Thus, operation resources of the base station are also wasted.

SUMMARY OF THE INVENTION

An object of the present invention is to overcome one or more drawbacks of the related-art method described above.

Another object of the present invention is to provide a system and method for exchanging state information in a mobile communication system, wherein an originating side terminal recognizes a reason of a communication blockage with respect to a receiving side terminal based on the exchanged state information and determines whether to attempt a recall.

Another object of the present invention is to provide a system and method of exchanging state information in a mobile communication system, wherein an originating side terminal attempts a recall according to a state of a receiving side terminal as determined by the exchanged state information, thereby preventing call processing resources of a base station from being wasted and thus increasing an efficiency.

Another object of the present invention is to provide a system and method of exchanging state information in a mobile communication system, wherein a call is automatically re-connected after a call connection release is generated because of a temporary network failure.

To achieve these and other objects and advantages, the present invention provides a system and method of exchanging state information in a mobile communication system including: a mobile communication terminal for transmitting various data including a voice signal and current state information, and displaying received state information of a mobile communication terminal of the other party; and a base station for updating and storing state information transmitted from the mobile communication terminal, and transmitting state information of one mobile communication terminal to the other mobile communication terminal when a call connection is terminated.

In accordance with another embodiment, the present invention provides a system and method of exchanging state information in a mobile communication system, including: a step in which a base station stores state information transmitted from each mobile communication terminal; a step in which the base station monitors whether mobile communication terminals are in a conversation phase; and a step in which when the call connection between the mobile communication terminals is terminated, the base station transfers the stored state information of one mobile communication terminal to the other mobile communication terminal.

In accordance with another embodiment, the present invention provides a system and method of exchanging state information in a mobile communication system, including: a step in which an originating side terminal and a receiving side terminal are call-connected; a step in which terminal state information transmitted from the originating side terminal and/or from the receiving side terminal is stored in a base station; a step in which the base station monitors a call connection state between the originating side terminal and the receiving side terminal; a step in which if the originating side terminal and the receiving side terminal are in a call connection state, the base station updates/stores status information of each terminal; a step in which if a call connection between the terminals is interrupted, it is checked whether the call has been interrupted because of a network failure; a step in which if the call has been interrupted due to the network failure, the originating side terminal automatically attempts a recall according to a communication environment; a step in which if a call termination message is received from the originating side terminal or from the receiving side terminal, the base station releases the call connection between the terminals; and a step in which state information of one terminal stored in the base station is transmitted to the other terminal.

In accordance with another embodiment, the present invention provides a system and method of exchanging state information in a mobile communication system, including: a step in which an originating side terminal and a receiving side terminal are call-connected; a step in which state information of the originating side terminal is transferred to a base station; a step in which a call interruption occurs due to a network failure; a step in which a timer starts operating; a step in which it is checked whether a call termination message is inputted from a user; a step in which it is sensed whether a received signal strength indication (RSSI) is restored to a level enough to make a call available; a step in which if the RSSI is restored so that a call is available, an automatic recall is attempted with a phone number stored in a memory; and a step in which when a call to the receiving side terminal is terminated, state information of the receiving side terminal received from the base station is displayed on a display unit.

In accordance with another embodiment, the present invention provides a system and method of exchanging state information in a mobile communication system, including: a step in which a receiving side terminal is call-connected to an originating side terminal through a base station; a step in which state information of the receiving side terminal is transferred to the base station; a step in which a call termination message is generated; a step in which state information of the originating side terminal is received from the base station; and a step in which state information of the originating side terminal is displayed on a display unit.

DETAILED DESCRIPTION OF PREFERRED EMBODIMENTS

Figure 1:
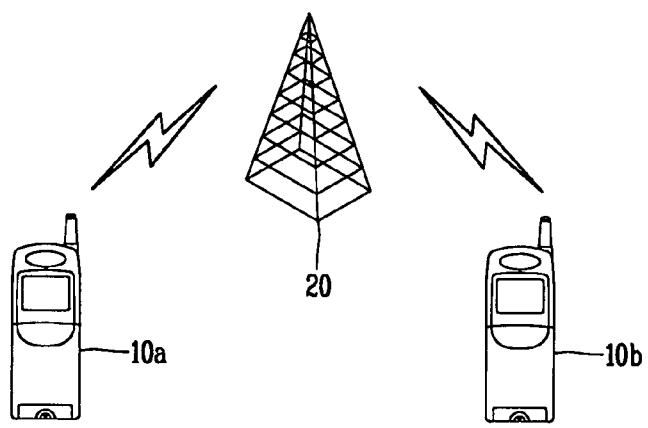
FIG. 1 illustrates a construction of a general mobile communication system.
Figure 2:
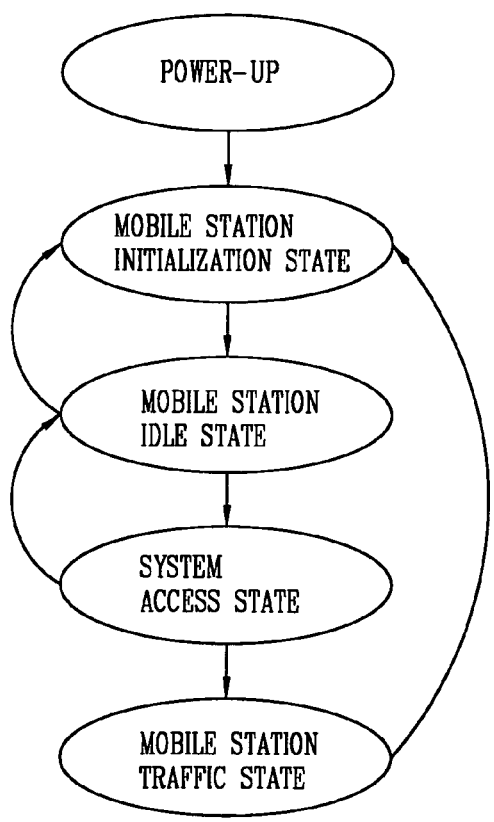
FIG. 2 is a flow chart of a call processing operation performed in the mobile communication system.
Figure 3:
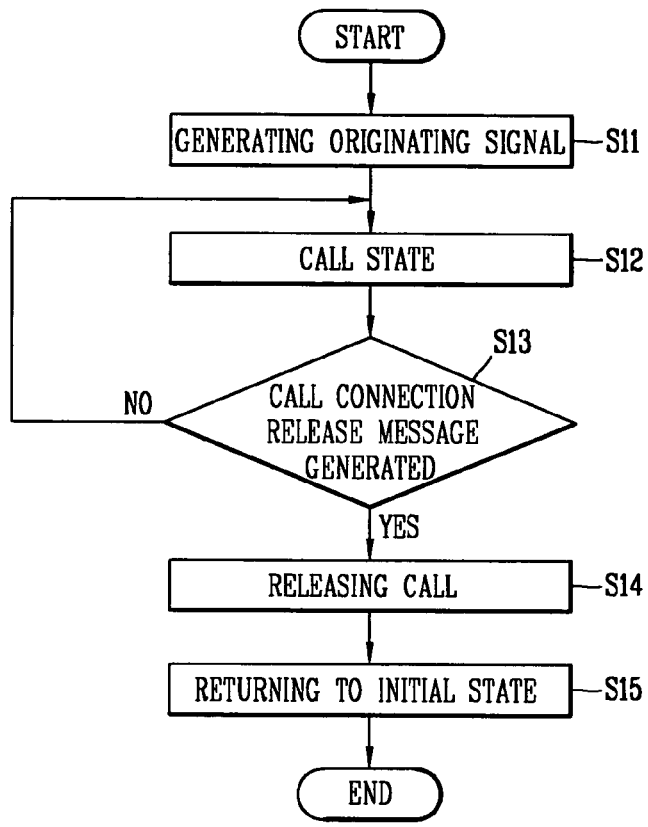
FIG. 3 is a flow chart of a related-art call method of a mobile communication system.

A system and method of exchanging state information in accordance with a preferred embodiment of the present invention may be performed in a mobile communication system as shown in FIG. 1. In this system, mobile communication terminals 10a and 10b each respectively transmit and receive various data including a voice signal and repeatedly transmit current state information. Base station 20 updates/stores the state information received from the mobile communication terminals 10a and 10b in an internal memory, and transfers the state information of one mobile terminal 10a or 10b to the other mobile communication terminal in one of a plurality of conditions occurs, e.g., a network failure.

Figure 4:
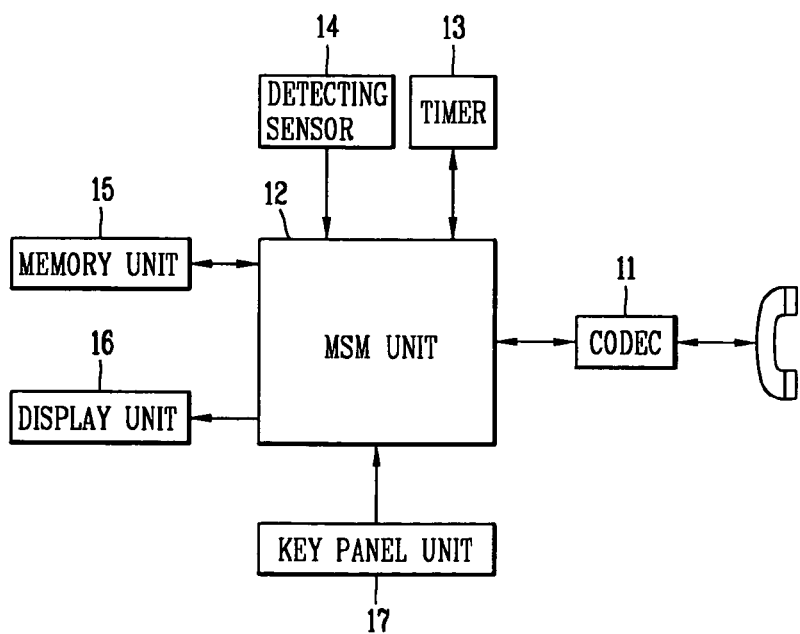
FIG. 4 is a schematic block diagram of a mobile communication terminal in accordance with a preferred embodiment of the present invention.

FIG. 4 shows an internal construction of the mobile communication terminals 10a and 10b in accordance with a preferred embodiment of the present invention. Each terminal respectively includes a codec 11 for processing a voice signal inputted/outputted through a handset into a digital signal, and an MSM unit 12 for transferring state information of the mobile communication terminal to the base station 20 and sensing an RSSI and executing an automatic call connection function, if a call is released due to a network failure. Each terminal also includes a timer 13 for counting certain time when the call is released, a detecting sensor 14 for judging whether a flip or a folder of the terminal is opened, a memory unit 15 connected to the MSM unit 12 for storing a recent call list and plural phone numbers, and a display unit 16 for displaying terminal operation-state information as a character or graphic. A key panel unit 17 is also included.

Figure 5:
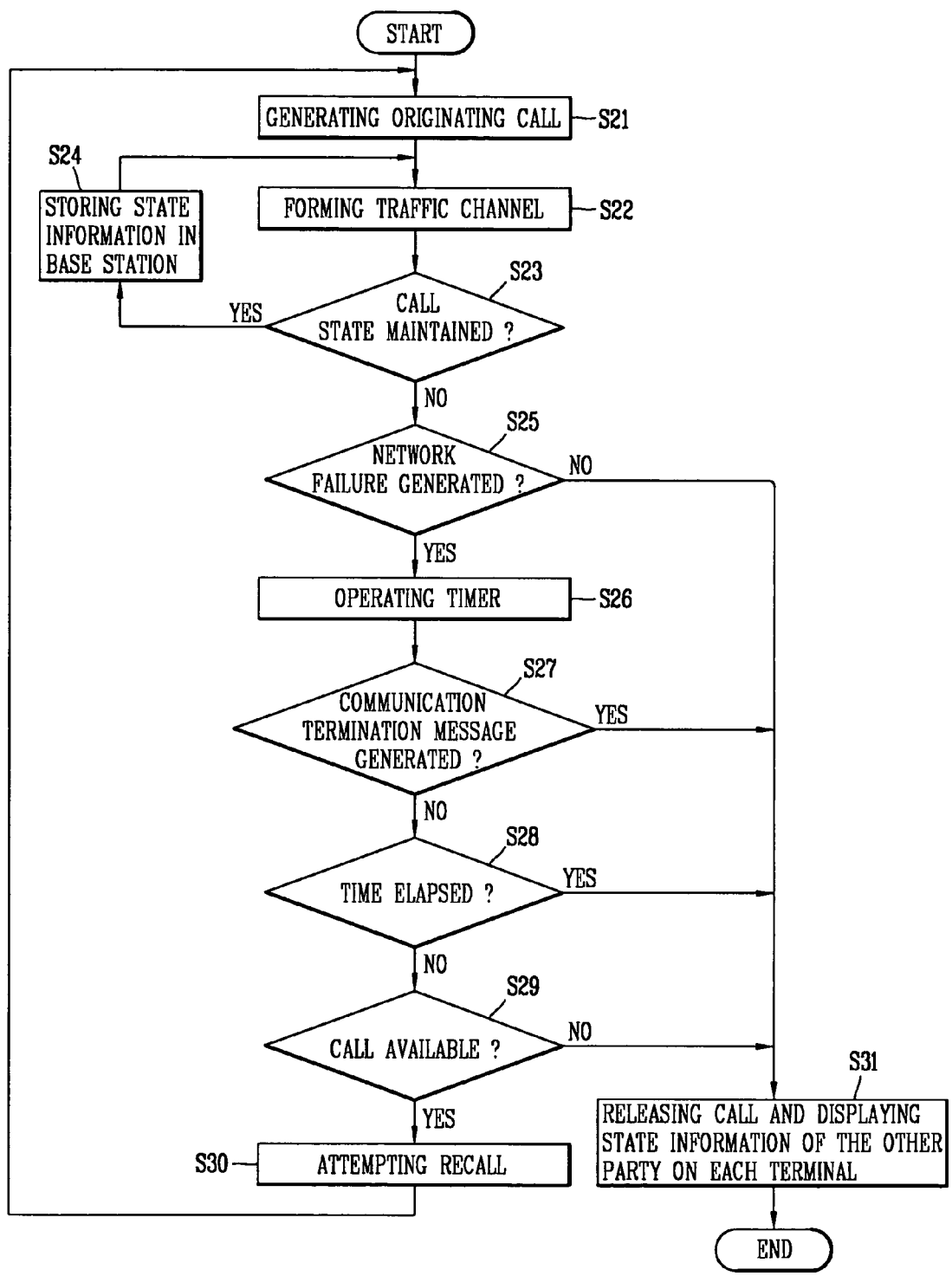
FIG. 5 is a flow chart showing steps included in a method performed in a mobile communication system in accordance with the preferred embodiment of the present invention.

FIG. 5 is a flow chart showing steps included in an operation method performed in the mobile communication system in accordance with a preferred embodiment of the present invention. When the base station 20 transfers an originating call received from the originating side terminal 10*a* to the receiving side terminal 10*b* (step S21), the receiving side terminal transfers a response message to the call and state information to the base station 20 indicative of a state of operation of the receiving side terminal. A traffic channel is then formed between the originating and receiving side terminals (step S22).

While the terminals 10*a* and 10*b* are communicating with each other, base station 20 updates/stores state information periodically transmitted from each of the terminals (step S24).

If a call release message is generated from the originating side terminal 10*a* or from the receiving side terminal 10*b*, the originating side terminal 10*a* checks whether the call connection to the receiving side terminal 10*b* has been released because of a network failure (step S25). If the call connection has been released because of a network failure, the originating side terminal 10 operates timer 13 for performing an automatic call connection (step S26).

While timer 13 of the originating side terminal is operated, the originating side terminal judges whether a call connection is currently available based on the RSSI (step S29). If a call connection is available, the originating side terminal automatically re-transfers an originating call in accordance with the last phone number stored in the memory unit 15 (step S30). If, however, a user inputs a call termination message through key panel unit 17 (step S27) or if a call connection is not available until a pre-set time after timer 13 elapses (step S28), the originating side terminal terminates operation of the timer 13.

If a call is released by the originating side terminal or by the receiving side terminal according to a user's intention, or if the pre-set time of the timer 13 of the originating side terminal elapses, base station 20 transfers the stored state information of one terminal to the other terminal, which had been call-connected. Upon receiving the state information, the other terminal displays a state of one terminal on a display unit 16 (step S31).

That is, base station 20 transfers the state information of the receiving side terminal 10*b* to the originating side terminal 10*a* and/or the state information of the originating side terminal 10*a* to the receiving side terminal 10*b*, so that each user can recognize a sudden call release due to a network failure or a performance degradation of the terminal.

The method of exchanging state information in accordance with a preferred embodiment of the present invention will now be described in greater detail with reference to FIGS. 4 and 5.

When a user of originating side terminal 10*a* inputs a phone number through key panel unit 17 and presses a call button, MSM unit 12 of the originating side terminal recognizes that and stores the input phone number in memory 15. At the same time, the MSM unit transfers an originating call with the corresponding phone number to base station 20.

Base station 20 processes the originating call received from the originating side terminal and transfers a terminating call to the receiving side terminal 10*b*, thereby forming a call.

In other words, when the user of the originating side terminal inputs a voice signal through a handset, codec 11 converts the voice signal into a digital signal and inputs the digital signal to MSM unit 12. Then, the MSM unit then radio-processes the voice signal and transfers it to receiving side terminal 10*b* via base station 20.

After performing a series of operations to establish the call, a user of the receiving side terminal transfers current state information of the receiving side terminal together with a response message to base station 20. The state information of the terminal may include one or more of battery voltage information, an RSSI, and ON/OFF information of the terminal. The originating side terminal 10*a* and the receiving side terminal 10*b* mutually display a propagation strength of the other terminal on their display units using the RSSI function of the terminal itself.

The base station 20 stores the state information received from the receiving side terminal in its memory. Then, while continuously checking the call connection state between the originating side terminal and the receiving side terminal, the base station keeps updating state information received from the receiving side terminal.

If the receiving side terminal or the originating side terminal are in a propagation shadow area and thus a call is temporarily interrupted, the MSM unit of 12 of the originating side terminal recognizes that and operates the timer 13. The timer 13 then counts a pre-set time, that is, time for judging a temporary network failure.

After the MSM unit operates the timer, the detecting sensor 14 detects whether a call termination button has been depressed through the key panel unit 17 of the originating side terminal 10*a* or whether an opening/closing unit such as a flip or a folder of the originating side terminal 10*a* has been closed.

If a signal of the call termination button has not been inputted, and the opening/closing unit has not been close, the MSM unit 12 continuously monitors an RSSI. If the MSM unit detects that a call connection is available, the MSM unit generates a recall signal with a phone number stored in the memory unit 15 of the originating side terminal 10*a* and transfers it to the base station 20 in order to resume the call.

If either a signal of the call termination button or a signal of the opening/closing unit is sensed, MSM unit 12 judges that the user of the originating side terminal has intentionally terminated the call, so it terminates the call.

If the call connection is interrupted because the receiving side terminal 10*b* is powered-off because of a battery voltage shortage, because the user of the receiving side terminal intentionally cuts it off, or because a network failure occurs, the base station transfers a call termination message to the originating side terminal 10*a* and to the receiving side terminal 10*b*, and then terminates the call.

After the call is terminated, the base station transfers the latest state information of the receiving side terminal 10*b* stored in the internal memory to the originating side terminal 10*a*, and the originating side terminal 10*a* displays the state information of the receiving side terminal 10*b* received from the base station 20 on the display unit 16.

The user of the originating side terminal checks the state information of the receiving side terminal displayed on the display unit 16 and performs a recall selectively.

Thus, if a call connection is not available because the receiving side terminal is powered-off or because of a network failure, the user of the originating side terminal does not need to perform a recall repeatedly.

Summarizing operation of the mobile communication system according to the above-described embodiment of the present invention, the receiving side terminal transfers state information to the base station and the state information of the receiving side terminal is displayed on the originating side terminal when a call is terminated.

In another embodiment, the originating side terminal transfers state information to the base station and the state information of the originating side terminal is displayed on the receiving side terminal when a call is terminated.

In another embodiment, the originating side terminal and the receiving side terminal may update/store state information at the base station and then receive the state information of the other terminal from the base station when a call is terminated.

The system and method of exchanging state information in another communication system according to the present invention therefore has at least the following advantages.

First, the base station continuously receives state information from mobile communication terminals in a call connection state, and transfers the state information of one mobile communication terminal to the other terminal when the call is released. Thus, users of the mobile communication terminal can be aware of a reason of the communication blockage, and if a call connection is not available, the user does not need to perform a recall. Therefore, the mobile communication terminal of the present invention is more effective and convenient to use compared with related-art terminals.

Second, because a user can selectively perform a recall function according to a reason of a call release, waste of operational resources of the base station can be significantly reduced and a battery consumption of the mobile communication terminal can also be reduced.

Third, if a call connection is temporarily interrupted due to a network failure and then the situation is restored within a pre-set time so a call connection is available, the originating side terminal automatically resets an originating call with a phone number stored in the memory. Thus, the call interruption occurring irrespective of the user's intention can be automatically restored.

Fourth, after a temporary call interruption due to a network failure, recall is automatically performed without a user's particular key manipulation, so that users' convenience is increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile communication system, comprising:
   a base station; and
   a first mobile terminal which transmits state information of the first mobile terminal to the base station, wherein the base station transmits the state information to a second mobile terminal to inform the second mobile terminal that a call was released based on a low reception signal strength of the first mobile terminal,
   wherein the second mobile terminal monitors the reception signal strength of first mobile terminal after the call release and performs an automatic call connection operation to re-establish the call when the signal strength of the first mobile terminal exceeds a predetermined level,
   wherein one of the first mobile terminal or second mobile terminal is the call originating terminal and the other of the first mobile terminal or second mobile terminal is the call receiving terminal, and
   wherein the first and second mobile terminals are subscriber terminals and wherein the call is re-established between the first and second mobile terminals through a signal path that does not pass through an intervening mobile subscriber terminal or a repeating mobile subscriber terminal.

2. The system of claim 1, wherein the base station receives state information of the second mobile terminal and transmits the state information of the second mobile terminal to the first mobile terminal.

3. The system of claim 2, wherein the first mobile terminal comprises:
   a display which displays the state information of the second mobile terminal received from the base station;
   a memory which stores a call list which includes a phone number of the second mobile terminal;
   a key panel including a call termination button;
   a detecting sensor for judging whether a flip or a folder of the first mobile terminal is opened;
   a timer which counts pre-set time after a call is released because of a network failure; and
   a mobile station modem unit which controls transmission of the state information of the first mobile terminal to the base station, senses a received signal strength of the second mobile terminal when a call connection between the first and second mobile terminals is released because of a network failure, and performs an automatic call connection function in response to the second call connection release.

4. The system of claim 1, wherein the base station includes a memory for storing the state information received from the first mobile terminal.

5. The system of claim 1, wherein the call connection operation is automatically performed by the second mobile terminal to re-establish the call independent from any user command to perform the automatic call operation input after the call release.

6. A method of managing communications in a mobile communication system, comprising:
   storing, in a base station, state information transmitted from a first mobile terminal, the state information indicative of a reception signal strength of the first mobile terminal;
   monitoring a call connection between the first mobile terminal and a second mobile terminal, said monitoring including periodically receiving state information from the first mobile terminal and updating previously stored state information;
   transmitting the stored state information transmitted from the first mobile terminal to the second mobile terminal when the call connection between the first and second mobile terminals is interrupted,
   automatically transmitting a recall signal when the call interruption is sensed,
   wherein one of the first mobile terminal or second mobile terminal is the call originating terminal and the other of the first mobile terminal or second mobile terminal is the call receiving terminal, and wherein the first and second mobile terminals are subscriber terminals and wherein the recall signal establishes a connection between the first and second mobile terminals through a path that does not pass through an intervening mobile subscriber terminal or a repeating mobile subscriber terminal.

7. The method of claim 6, wherein the storing further comprises:
    receiving an originating signal from the second mobile terminal;
    transferring a terminating signal to the first mobile terminal;
    receiving the state information from the first mobile terminal in response to the terminating signal.

8. The method of claim 6, wherein the monitoring comprises:
    sensing whether the call interruption has occurred because of a network failure.

9. The method of claim 6, wherein the transmitting comprises:
    receiving a call termination message;
    transferring the stored state information transmitted from the first mobile terminal to the second mobile terminal in response to the call termination message.

10. The method of claim 9, wherein the call termination message is generated by a call termination button of a key panel unit of the first mobile terminal or as a result of a folder or flip of the first mobile terminal being closed.

11. A method of managing calls in a mobile communication system, comprising:
    connecting a call between an originating side terminal and a receiving side terminal;
    periodically storing state information transmitted from at least one of the originating side and receiving side terminals in a base station;
    monitoring a call connection between the originating side and receiving side terminals;
    when the originating side and receiving side terminals are in a call connection state, storing status information for each of the terminals;
    when the call connection between the terminals is interrupted, checking whether the call has been interrupted because of a network failure;
    when the call has been interrupted because of a network failure, automatically attempting a recall from the originating side terminal;
    when a call termination message is received from the originating side terminal or from the receiving side terminal, releasing the call connection between the terminals at the base station; and
    transmitting the state information of one of the originating side and receiving side terminals to the other of the originating side and receiving side terminals after the call connection is released, wherein the originating and receiving side terminals are subscriber terminals and wherein the call connection and recall is established between the originating and receiving side terminals through a signal path that does not pass through an intervening mobile subscriber terminal or a repeating mobile subscriber terminal.

12. The method of claim 11, wherein the call connecting comprises:
    transferring an originating signal from the originating side terminal to the base station;
    transferring a terminating signal from the base station to the receiving side terminal; and
    transferring a response message from the receiving side terminal to the base station in response to the terminating signal, thereby forming a traffic channel.

13. The method of claim 11, wherein the state information includes one of battery voltage information received signal strength indication information, and ON/OFF information of at least one of the terminals.

14. The method of claim 11, wherein the call termination message is generated by a call termination button of a key panel unit of one of the terminals or as a result of detection of a folder or a flip of one of the terminals closing.

15. The method of claim 11, wherein the recall attempting comprises:
    checking whether the call connection has been interrupted because of a network failure;
    starting a timer;
    judging whether a call termination message has been received;
    monitoring received signal strength; and
    transmitting a recall signal if the received signal strength is greater than a predetermined reference value.

16. The method of claim 15, wherein the recall signal transferring includes:
    paging a phone number stored in a memory unit of the originating side terminal; and
    transmitting an originating call.

17. The method of claim 16, wherein if the timer elapses or a call termination message is received, terminating the recall attempting of the originating side terminal.

18. The method of claim 11, wherein transmitting the state information comprises:
    transmitting the state information of the originating side terminal stored in the base station to the receiving side terminal; and
    transmitting the state information of the receiving side terminal to the originating side terminal.

19. The method of claim 18, wherein transmitting the state information comprises: displaying the received state information on a display unit.

20. A method of managing calls in a mobile communication system, comprising:
    connecting a call between an originating side terminal and a receiving side terminal;
    transmitting state information of the originating side terminal to a base station;
    checking whether a call termination message is input from a user in response to a call interruption;
    sensing whether a received signal strength transmitted by one of the originating or receiving side terminals to the other of the originating or receiving side terminals is restored to a level sufficient to make a call available;
    when the received signal strength is restored, automatically attempting a recall based on a phone number stored in a memory;
    when the call to the receiving side terminal is terminated, receiving state information of the receiving side terminal; and
    displaying the state information indicative of the signal strength of the receiving side terminal on the originating side terminal, wherein the originating and receiving side terminals are subscriber terminals and wherein the call and recall is established between the originating and receiving side terminals through a signal path that does not pass through an intervening mobile subscriber terminal or a repeating mobile subscriber terminal.

21. The method of claim 20, further comprising:
    continuously transmitting the state information of the originating side terminal to the base station; and
    updating a memory of the base station with the continuously transmitted state information.

22. The method of claim 20, further comprising:
    starting a timer when the call interruption is detected; and
    judging that the call interruption resulted from a network failure when the timer expires.

23. The method of claim 20, wherein the call termination message is generated by a call termination button of a terminal key panel unit or as a result of detection of a terminal folder or flip closing.

24. The method of claim 20, wherein if the timer elapses or the call termination message is input, the originating side terminal terminates the recall attempting and then terminates a call to the receiving side terminal.

* * * * *